US011566908B2

United States Patent
Seki et al.

(10) Patent No.: US 11,566,908 B2
(45) Date of Patent: Jan. 31, 2023

(54) RIDE-SHARING ASSISTANCE SYSTEM, RIDE-SHARING ASSISTANCE APPARATUS AND RIDE-SHARING ASSISTANCE METHOD

(71) Applicant: TOYOTA JIDOSHA KABUSHIKI KAISHA, Toyota (JP)

(72) Inventors: Yushi Seki, Ashigarakami-gun (JP); Ryoko Hashimoto, Fuji (JP); Katsuya Terahata, Susono (JP); Daiki Yokoyama, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 799 days.

(21) Appl. No.: 16/367,665

(22) Filed: Mar. 28, 2019

(65) Prior Publication Data
US 2019/0360827 A1 Nov. 28, 2019

(30) Foreign Application Priority Data
May 22, 2018 (JP) .............................. JP2018-098193

(51) Int. Cl.
*G01C 21/34* (2006.01)
*G08G 1/14* (2006.01)
(Continued)

(52) U.S. Cl.
CPC ......... *G01C 21/3438* (2013.01); *G06Q 10/02* (2013.01); *G06Q 50/30* (2013.01); *G08G 1/144* (2013.01)

(58) Field of Classification Search
CPC .... G01C 21/3438; G06Q 10/02; G06Q 50/30; G06Q 10/06315; G06Q 30/0283; G08G 1/144; G08G 1/005; G08G 1/146; G08G 1/148; G08G 1/202; G08G 1/14; H04W 4/021
See application file for complete search history.

(56) References Cited

U.S. PATENT DOCUMENTS

| | | | | |
|---|---|---|---|---|
| 2007/0276595 | A1* | 11/2007 | Lewinson | G01C 21/3484 701/533 |
| 2017/0069146 | A1* | 3/2017 | Sun | G06Q 30/0631 |
| 2019/0272483 | A1* | 9/2019 | Hiray | G06Q 10/02 |

FOREIGN PATENT DOCUMENTS

| | | |
|---|---|---|
| JP | 2002-140399 A | 5/2002 |
| JP | 2013-030016 A | 2/2013 |

OTHER PUBLICATIONS

English Translation of reference JP2013030016 (Year: 2013).*

* cited by examiner

*Primary Examiner* — Rachid Bendidi
(74) *Attorney, Agent, or Firm* — Oliff PLC

(57) ABSTRACT

A ride-sharing assistance system includes a plurality of terminals and a ride-sharing assistance apparatus capable of communicating with each of the plurality of terminals. The ride-sharing assistance apparatus sends, when the number of inquiry signals received from at least two terminals of the plurality of terminals for requesting inquiry about a parking space available at a same destination is greater than a vacancy reference value in accordance with the number of available parking spaces within a certain range from the destination, a suggestion signal for suggesting ride-sharing on a vehicle owned by any one of users of the at least two terminals, from which the inquiry signal has been sent, to each of the at least two terminals from which the inquiry signal has been sent.

2 Claims, 7 Drawing Sheets

(51) Int. Cl.
*G06Q 50/30* (2012.01)
*G06Q 10/02* (2012.01)

RIDE-SHARING ASSISTANCE SYSTEM, RIDE-SHARING ASSISTANCE APPARATUS AND RIDE-SHARING ASSISTANCE METHOD

FIELD

The present invention relates to a ride-sharing assistance system, a ride-sharing assistance apparatus, and a ride-sharing assistance method for assisting a plurality of users in sharing a ride on a vehicle.

BACKGROUND

It is preferable for a plurality of users who are going to travel to the same destination to share a ride in a single vehicle to the destination than to separately drive to the destination in terms of reducing traffic congestion and exhaust gases. Accordingly, techniques have been proposed for assisting a plurality of users in sharing a ride on a single vehicle (for example, refer to Japanese Unexamined Patent Publication (Kokai) No. 2002-140399).

For example, an automobile ride-sharing supporting system disclosed in Japanese Unexamined Patent Publication (Kokai) No. 2002-140399 performs a process of matching driving plan information input from a driver side terminal with ride-sharing request information input from a rider side terminal, and sends a meeting place and a meeting time to each terminal. When the system receives that the ride-sharing has been completed from each terminal, the system pays points owned by the rider to the driver.

SUMMARY

However, to achieve ride-sharing on a single vehicle by the plurality of users, each user is required to travel to a determined meeting place at a determined meeting time; this may cause the user to feel stress or inconvenience. For this reason, depending on circumstances, it may be preferable for each user to separately travel to the destination by means of a vehicle each user owns in order to decrease stress and inconvenience.

Therefore, an object of the present invention is to provide a ride-sharing assistance system that can appropriately determine whether to suggest ride-sharing.

According to one aspect of the present invention, a ride-sharing assistance system including a plurality of terminals and a ride-sharing assistance apparatus capable of communicating with each of the plurality of terminals is provided. In the ride-sharing assistance system, the ride-sharing assistance apparatus sends, when the number of inquiry signals received from at least two terminals of the plurality of terminals for requesting inquiry about a parking space available at a same destination is greater than a vacancy reference value in accordance with the number of available parking spaces within a certain range from the destination, a suggestion signal for suggesting ride-sharing on a vehicle owned by any one of users of the at least two terminals, from which the inquiry signal has been sent, to each of the at least two terminals from which the inquiry signal has been sent.

As another aspect of the present invention, a ride-sharing assistance apparatus is provided. The ride-sharing assistance apparatus includes: a communication circuit capable of communicating with a plurality of terminals; and a processor configured to send, when the number of inquiry signals received via the communication circuit from at least two terminals of the plurality of terminals for requesting inquiry about a parking space available at a same destination is greater than a vacancy reference value in accordance with the number of available parking spaces within a certain range from the destination, a suggestion signal for suggesting ride-sharing on a vehicle owned by any one of users of the at least two terminals, from which the inquiry signal has been sent, to each of the at least two terminals from which the inquiry signal has been sent via the communication circuit.

In the ride-sharing assistance apparatus, the processor preferably is further configured to refer to information on a vehicle owned by each of the users of the at least two terminals from which the inquiry signal has been sent and information on an available parking space to select a vehicle that can be parked in an available parking space from among the vehicles owned by the users of the at least two terminals from which the inquiry signal has been sent as a vehicle to be used for the ride-sharing, and send information for identifying the selected vehicle to each of the at least two terminals from which the inquiry signal has been sent via the communication circuit.

In this case, the information on the vehicle includes at least one item of comfort, fuel economy, and accident history of the vehicles, and the processor preferably selects a vehicle for which a sum of evaluation values for the at least one item is maximum from among the vehicles, which are owned by the users of the at least two terminals from which the inquiry signal has been sent and which can be parked in the available parking space, as the vehicle to be used for the ride-sharing.

According to still another aspect of the present invention, a ride-sharing assistance method in a ride-sharing assistance system including a plurality of terminals and a ride-sharing assistance apparatus capable of communicating with each of the plurality of terminals is provided. The ride-sharing assistance method includes: sending, by at least two terminals of the plurality of terminals, an inquiry signal for requesting inquiry about a parking space available at a same destination to the ride-sharing assistance apparatus; and sending by the ride-sharing assistance apparatus, when the number of the inquiry signals received from the at least two terminals of the plurality of terminals is greater than a vacancy reference value in accordance with the number of available parking spaces within a certain range from the destination, a suggestion signal for suggesting ride-sharing on a vehicle owned by any one of users of the at least two terminals, from which the inquiry signal has been sent, to each of the at least two terminals from which the inquiry signal has been sent.

The ride-sharing assistance system according to the present invention provides an advantageous effect that determination on whether to suggest ride-sharing is appropriately made.

DESCRIPTION OF EMBODIMENTS

With reference to figures, a ride-sharing assistance system, a ride-sharing assistance apparatus, and a ride-sharing assistance process executed by the ride-sharing assistance system will be described below. The ride-sharing assistance system includes a plurality of terminals and a ride-sharing assistance apparatus, and when the ride-sharing assistance apparatus receives inquiries from terminals of at least two users about a parking space available at a same destination, the ride-sharing assistance apparatus compares a vacancy reference value based on the number of available parking spaces among parking spaces within a certain range from the destination with the number of the terminals from which the inquiries have been made. When the number of the terminals from which the inquiries about the available parking space have been made is greater than the vacancy reference value, the ride-sharing assistance apparatus sends a signal for suggesting ride-sharing to each of the terminals from which the inquiries have been made; on the other hand, when the number of the terminals from which the inquiries have been made is equal to or smaller than the vacancy reference value, the ride-sharing assistance apparatus does not suggest ride-sharing. In other words, the ride-sharing assistance system suggests ride-sharing only when it is estimated that any one of vehicles of the users may not be parked in a parking space within a certain range from the destination if the users travel to the destination on different vehicles. The ride-sharing assistance system also selects, on the basis of information on the vehicles of the users, information on the available parking space, etc., a vehicle suitable for the ride-sharing from the vehicles of the users, and suggests using the selected vehicle for the ride-sharing to the users. Furthermore, the ride-sharing assistance system receives points corresponding to an amount of a price for the ride-sharing from each of the users who shared the ride, and pays, to the user of the vehicle used for the ride-sharing, points after subtracting a service charge from the received points.

Figure 1:
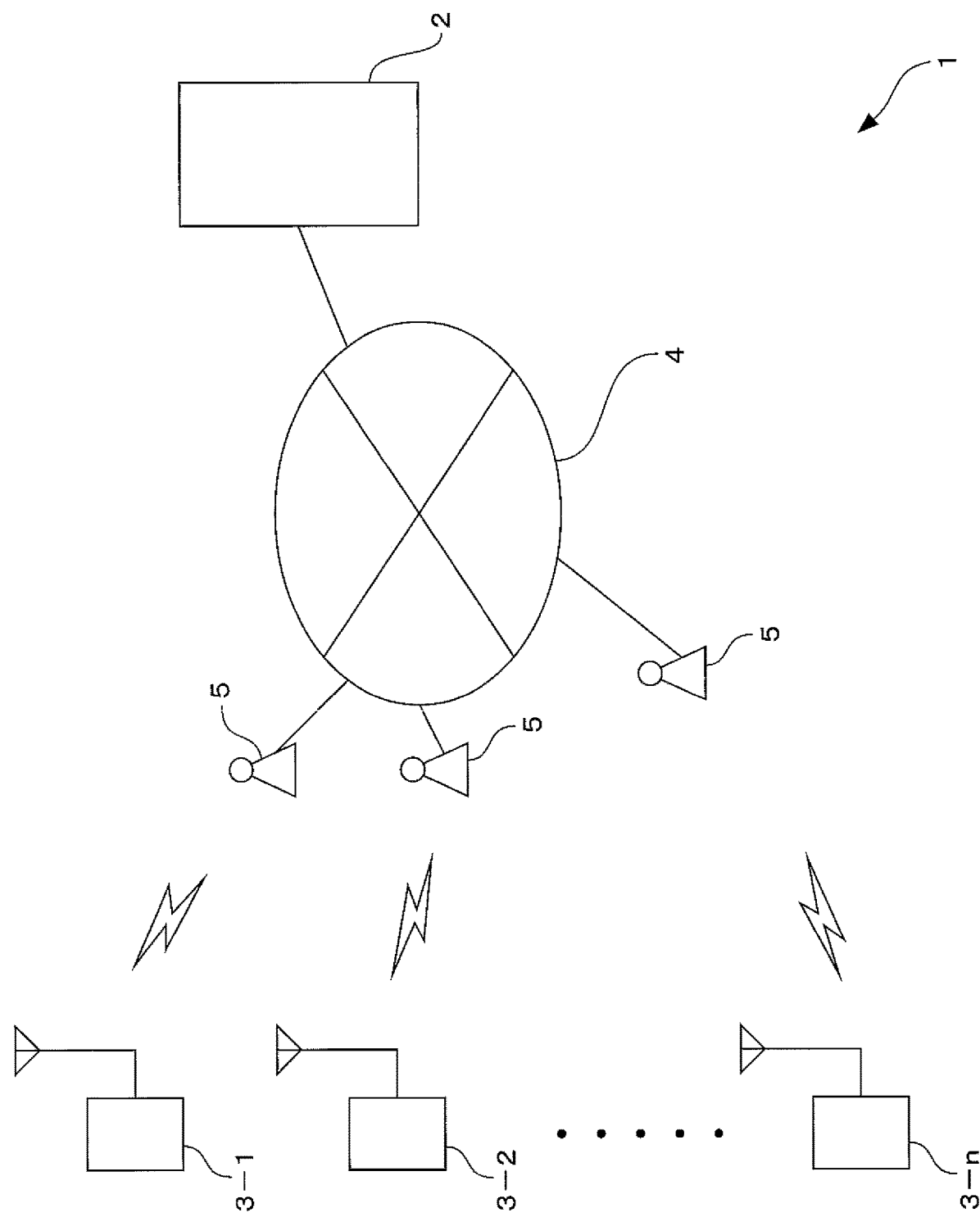
FIG. 1 is a schematic configuration diagram of a ride-sharing assistance system according to one example embodiment.

FIG. 1 is a schematic configuration diagram of the ride-sharing assistance system according to one example embodiment. The ride-sharing assistance system 1 includes a server 2, which is an example of the ride-sharing assistance apparatus, and a plurality of terminals 3-1 to 3-n (n is an integer of three or greater). The server 2 and the terminals 3-1 to 3-n are configured to be capable of communicating with each other via a communication network 4, for example, constructed by optical communication lines. In addition, the server 2 is configured to be capable of mutually communicating with a garage management system (not illustrated) that manages garages in an area covered by a ride-sharing assistance process, i.e., the area in which a service based on the ride-sharing assistance process is provided, via the communication network 4.

The server 2 is connected to the communication network 4, for example, via a gateway (not illustrated). The server 2 stores information on a vehicle owned by each of the users of the terminals 3-1 to 3-n, and point information representing a balance of points that indicates an economic value owned by each of the users of the terminals 3-1 to 3-n. The server 2 executes processing of a portion associated with the server 2 of the ride-sharing assistance process. In other words, when the destinations in inquiries about an available parking space informed by at least two of the terminals 3-1 to 3-n are the same, the server 2 inquires of the garage management system about availability status of a parking space within a certain range from the destination, information on an available parking space (for example, a size of a vehicle that can be parked in the parking space, presence or absence of a charging facility, or the like). The server 2 then compares the number of terminals from which the inquiries about a parking space available at the same destination have been made, i.e., the number of vehicles of the users who are going to travel to the same destination, with the vacancy reference value that is determined on the basis of the number of available parking spaces to determine whether to suggest ride-sharing to the users of the terminals from which the inquiries about the parking space have been made. When the server 2 suggests ride-sharing, the server 2 sends a suggestion signal for suggesting ride-sharing to the terminal of each of the users. Subsequently, upon receiving an acceptance signal for accepting the ride-sharing from each of the users to whom the ride-sharing has been suggested, the server 2 selects, on the basis of the information on the vehicles of the users who will share a ride, information on the available parking space, etc., a vehicle to be used for the ride-sharing from among the vehicles of the users. The server 2 further calculate a route for the selected vehicle including a meeting place and a meeting time for each of the users, notifies the terminal of each of the users who will share the ride of information for identifying the selected vehicle, the meeting place and the meeting time, etc., and sends, to the garage management system, a reservation signal for reserving a parking space at the destination. The server 2 receives points corresponding to an amount of a price for the ride-sharing from each of the users who shared the ride, and pays, to the user of the vehicle used for the ride-sharing, points after subtracting a service charge from the received points.

Each of the terminals 3-1 to 3-n is a portable terminal having a wireless communication function, for example, a mobile phone or a tablet computer. The terminals 3-1 to 3-n may be the same type of devices; alternatively, the terminals 3-1 to 3-n may include devices of different types from each other. Each of the terminals 3-1 to 3-n accesses a wireless base station 5 connected to the communication network 4, for example, via a gateway (not illustrated) to connect to the communication network 4 via the wireless base station 5. Each of the terminals 3-1 to 3-n can send an inquiry signal for informing a current location and a destination of a user and inquiring about an available parking space, which is generated in response to an operation by the user, an acceptance signal, or the like to the server 2 via the communication network 4, or receive a suggestion signal or the like from the server 2 via the communication network 4. In the following description, for the sake of convenience, a terminal from which the inquiry signal has been sent may be referred to as an inquiry terminal.

Figure 2:
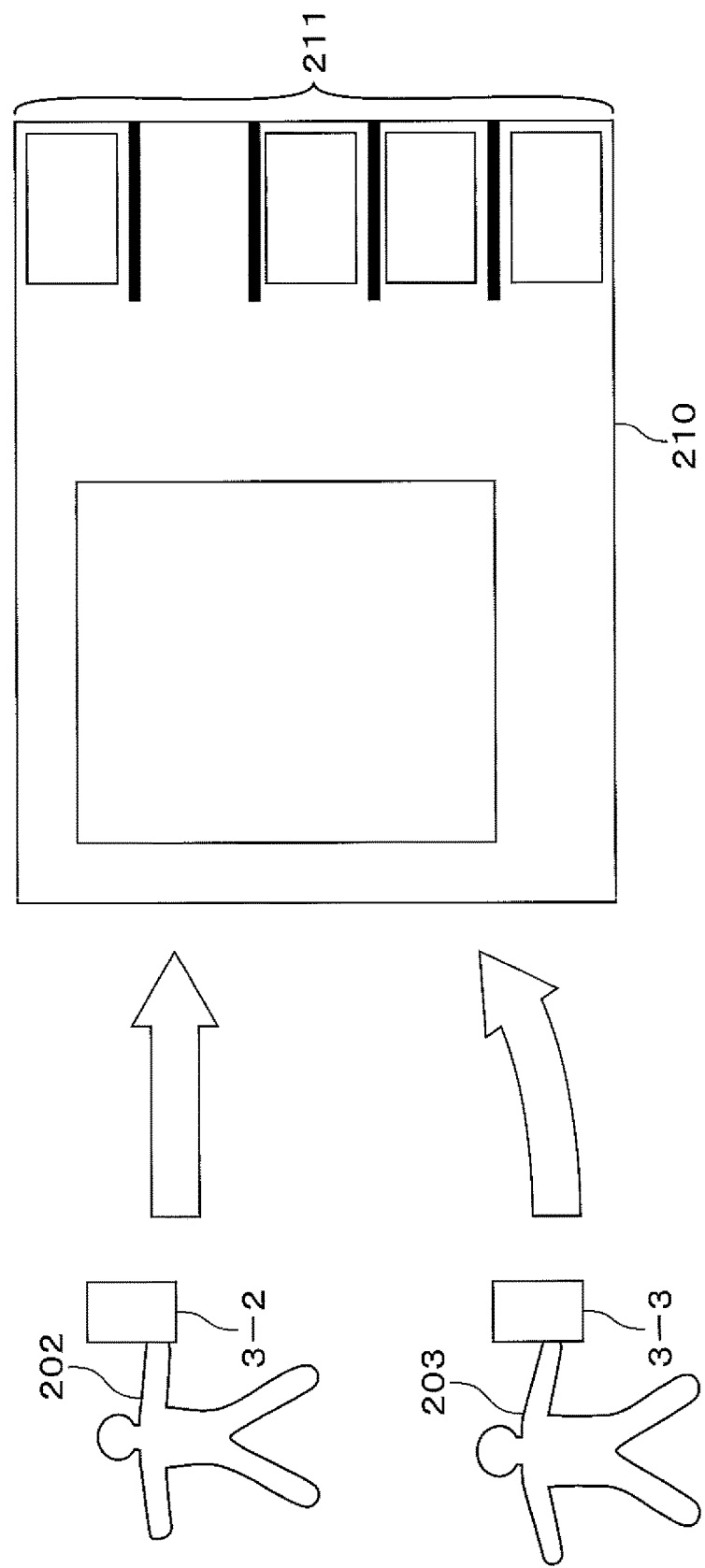
FIG. 2 is a diagram illustrating an example of a situation in which a ride-sharing assistance process is executed.

FIG. 2 is a diagram illustrating an example of a situation in which the ride-sharing assistance process is executed. In this example, each of a user 201 of the terminal 3-1, a user 202 of the terminal 3-2, and a user 203 of the terminal 3-3 is going to travel to a same destination 210. However, a parking space 211 within a certain range from a destination 210 is available for only one vehicle. Therefore, the server 2 suggests ride-sharing to the users 201 to 203.

Figure 3:
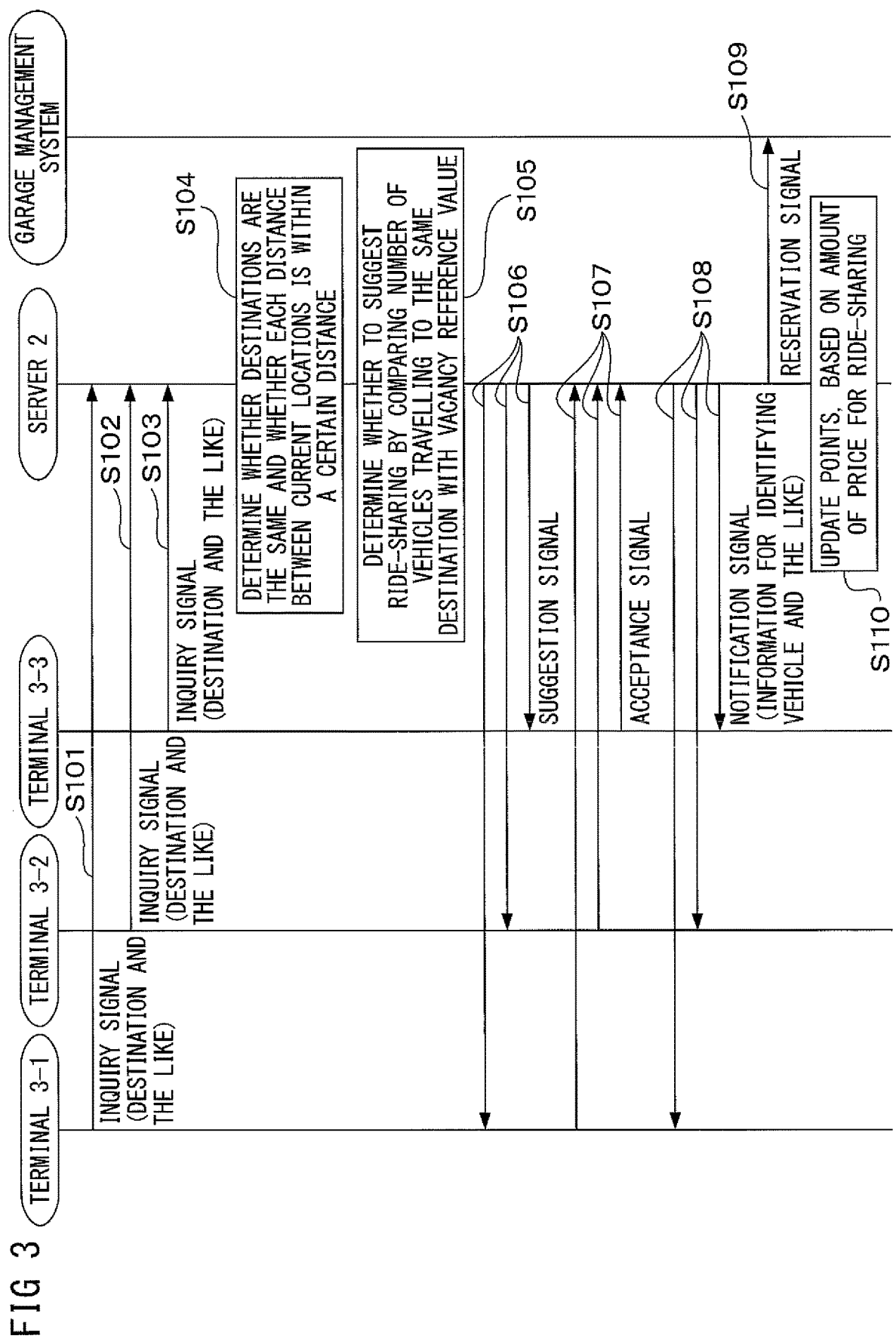
FIG. 3 is a sequence diagram with respect to the ride-sharing assistance process.

FIG. 3 is a sequence diagram with respect to the ride-sharing assistance process. In the sequence diagram illustrated in FIG. 3, communication between each terminal and the server is performed, as described above, via the communication network 4.

The user of the terminal 3-1 operates the terminal 3-1 to start an application associated with the ride-sharing assistance process, and performs, through the application, an operation for informing a current location and a destination to inquire about the parking space. The terminal 3-1 then generates an inquiry signal and sends the inquiry signal to the server 2 (step S101). The user of the terminal 3-2 also operates the terminal 3-2 to start an application associated with the ride-sharing assistance process, and perform, through the application, an operation for informing a current location and a destination to inquire about the parking space. The terminal 3-2 then generates an inquiry signal and sends the inquiry signal to the server 2 (step S102). Furthermore, the user of the terminal 3-3 operates the terminal 3-3 to start an application associated with the ride-sharing assistance process, and perform, through the application, an operation for informing a current location and a destination to inquire about the parking space. The terminal 3-3 then generates an inquiry signal and sends the inquiry signal to the server 2 (step S103). In the inquiry signals, the destination and the current location are represented by, for example, a facility name, an address, or a combination of longitude and latitude.

When timings at which the inquiry signals from the terminals 3-1 to 3-3 are received within a certain period of time (for example, three minutes to ten minutes), the server 2 determines whether the destinations included in the respective inquiry signals received from the terminals are the same, and determines whether each distance between current locations of the users of the terminals is equal to or less than a certain distance (for example, 1 km to 2 km) (step S104). For example, the server 2 determines, when the facility names or the addresses of the destinations included in the respective inquiry signals received from the terminals are the same, that the destinations are the same. Alternatively, the server 2 may determine, when the server 2 calculates distances between the destinations included in the respective inquiry signals received from the terminals and the distances are equal to or less than a predetermined distance threshold (for example, 50 m to 200 m), that the destinations are the same.

When the destinations included in the respective inquiry signals received from the terminals are the same and each distance between the current locations of the users of the terminals is equal to or less than the certain distance, the server 2 compares the number of received inquiry signals, i.e., the number of the vehicles of the users who are going to travel to the same destination, with a vacancy reference value that is determined on the basis of the number of available parking spaces within a certain range from the destination to determine whether to suggest ride-sharing to the users of terminals from which the server 2 has been informed that the users are going to the same destination (step S105). When the number of the received inquiry signals is greater than the vacancy reference value, the server 2 determines to suggest ride-sharing and sends, to each of the terminals from which the inquiry signal has been sent (i.e., the inquiry terminals), a suggestion signal for suggesting ride-sharing (step S106).

The certain range for the destination may be a range, for example, within a parking lot which is located at the destination or within a certain distance from the destination (for example, 100 m to 200 m). The vacancy reference value may be, for example, a number after subtracting a predetermined offset number from the number of available parking spaces. The offset number may be, for example, set in advance, and may be, for example, 0 to 2. The offset number may be set according to the destination. In this case, the offset number may be set to a larger value, for example, as an average of the number of available parking spaces, which is calculated from a history of an availability status of a parking lot which is located somewhere in the destination area, is smaller. The average of the number of available parking spaces may be calculated for each time period or each day. The offset number may be set according to the average of the number of available parking spaces for a day or a time period in which the ride-sharing assistance process is executed. Setting the offset number as described above reduces possibility that a parking space may not be reserved due to a change in the number of available parking spaces generated by a time lag between a time at which the server 2 receives an inquiry signal and a time at which the server 2 actually reserves a garage.

When the user of each inquiry terminal accepts the ride-sharing suggestion, each inquiry terminal sends an acceptance signal for accepting the ride-sharing to the server 2 (step S107). Upon receiving the acceptance signal from each inquiry terminal, the server 2 selects, on the basis of the information on the vehicles of the users who will share a ride, information on the available parking space, etc., a vehicle to be used for the ride-sharing from the vehicles of the users. The server 2 further calculates a route for the selected vehicle including a meeting place and a meeting time for each of the users. The server 2 then sends, to the inquiry terminal of each of the users who will share the ride, a notification signal for informing information for identifying the selected vehicle, the meeting place and the meeting time, etc. (step S108). Furthermore, the server 2 sends, to the garage management system, a reservation signal for reserving a parking space at the destination (step S109).

The server 2 receives points corresponding to an amount of a price for the ride-sharing from each of the users who shared the ride, and pays, to the user of the vehicle used for the ride-sharing, points after subtracting a service charge from the received points (step S110). Then, the ride-sharing assistance system ends the ride-sharing assistance process.

Details of the server 2 will be described below.

Figure 4:
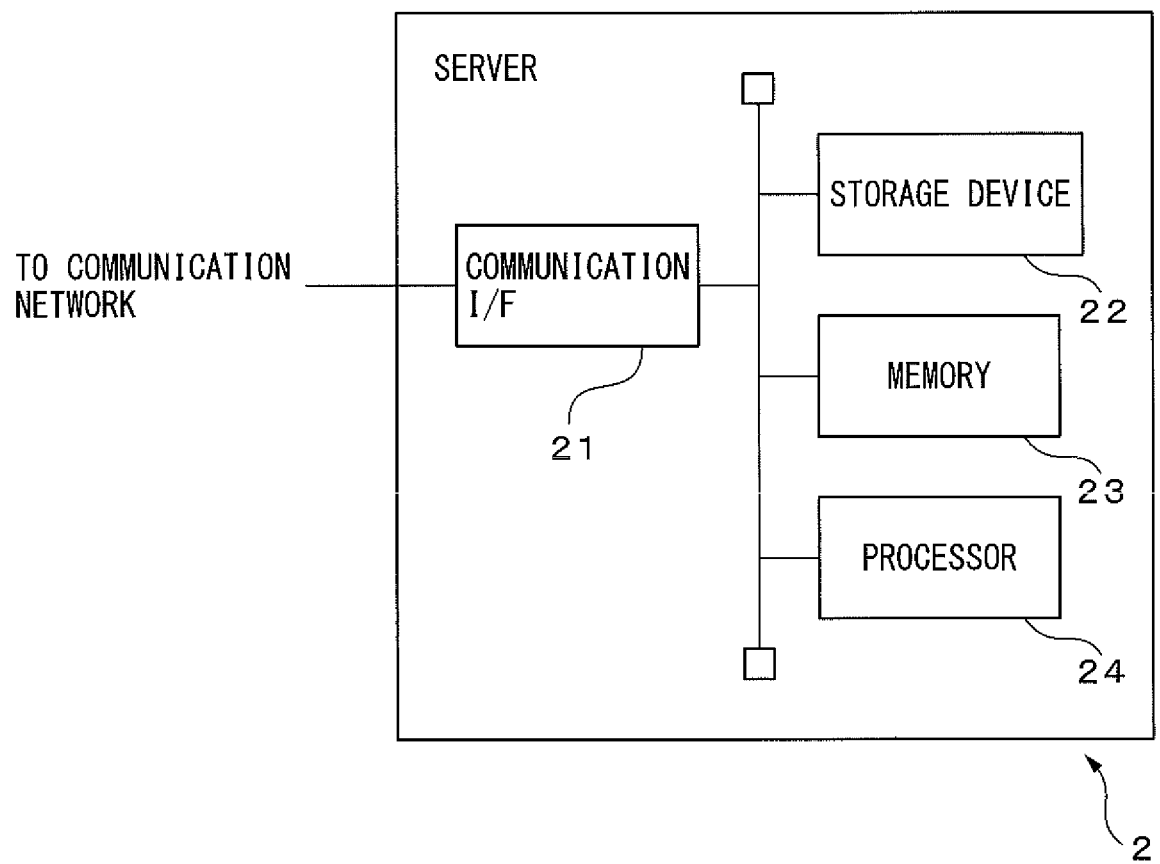
FIG. 4 is a schematic configuration diagram of a server that is an example of a ride-sharing assistance apparatus.

FIG. 4 is a schematic configuration diagram of the server 2. The server 2 includes a communication interface 21, a storage device 22, a memory 23, and a processor 24. The communication interface 21, the storage device 22, and the memory 23 are connected to the processor 24 via a signal line. The server 2 may further include an input device such as a keyboard or a mouse and an output device such as a display.

The communication interface 21 is an example of the communication unit, and includes an interface circuit for connecting the server 2 to the communication network 4. The communication interface 21 is configured to be capable of communicating with each of the terminals 3-1 to 3-n. In other words, the communication interface 21 passes the inquiry signal, the acceptance signal, etc., received from any one of the terminals 3-1 to 3-n via the communication network 4 to the processor 24. The communication interface 21 outputs a suggestion signal, etc., received from the processor 24 to the communication network 4.

The storage device 22 is an example of a storage unit, and includes, for example, a hard disk device or an optical recording medium and an access device therefor. The storage device 22 stores, for each of the terminals 3-1 to 3-n, identification information on the terminal and a vehicle license-plate number of the vehicle owned by the user of the terminal and information on the vehicle such as a vehicle type and a size in association with each other. The storage device 22 also stores, for each of the terminals 3-1 to 3-*n*, a name, a user number, and point information of the user of the terminal. The storage device 22 further stores map information. The identification information on each terminal may be, for example, a MAC address. In addition, the storage device 22 may also store a computer program for executing the ride-sharing assistance process.

The memory 23 is another example of the storage unit, and includes, for example, non-volatile semiconductor memory and volatile semiconductor memory. The memory 23 stores various types of data generated during execution of the ride-sharing assistance process.

The processor 24 is an example of the control unit, and includes one or more CPUs (Central Processing Unit) and a peripheral circuit thereof. The processor 24 may further include another arithmetic circuit such as an arithmetic logic unit or a numeric data processing unit. The processor 24 executes processing of the portion associated with the server 2 of the ride-sharing assistance process.

Figure 5:
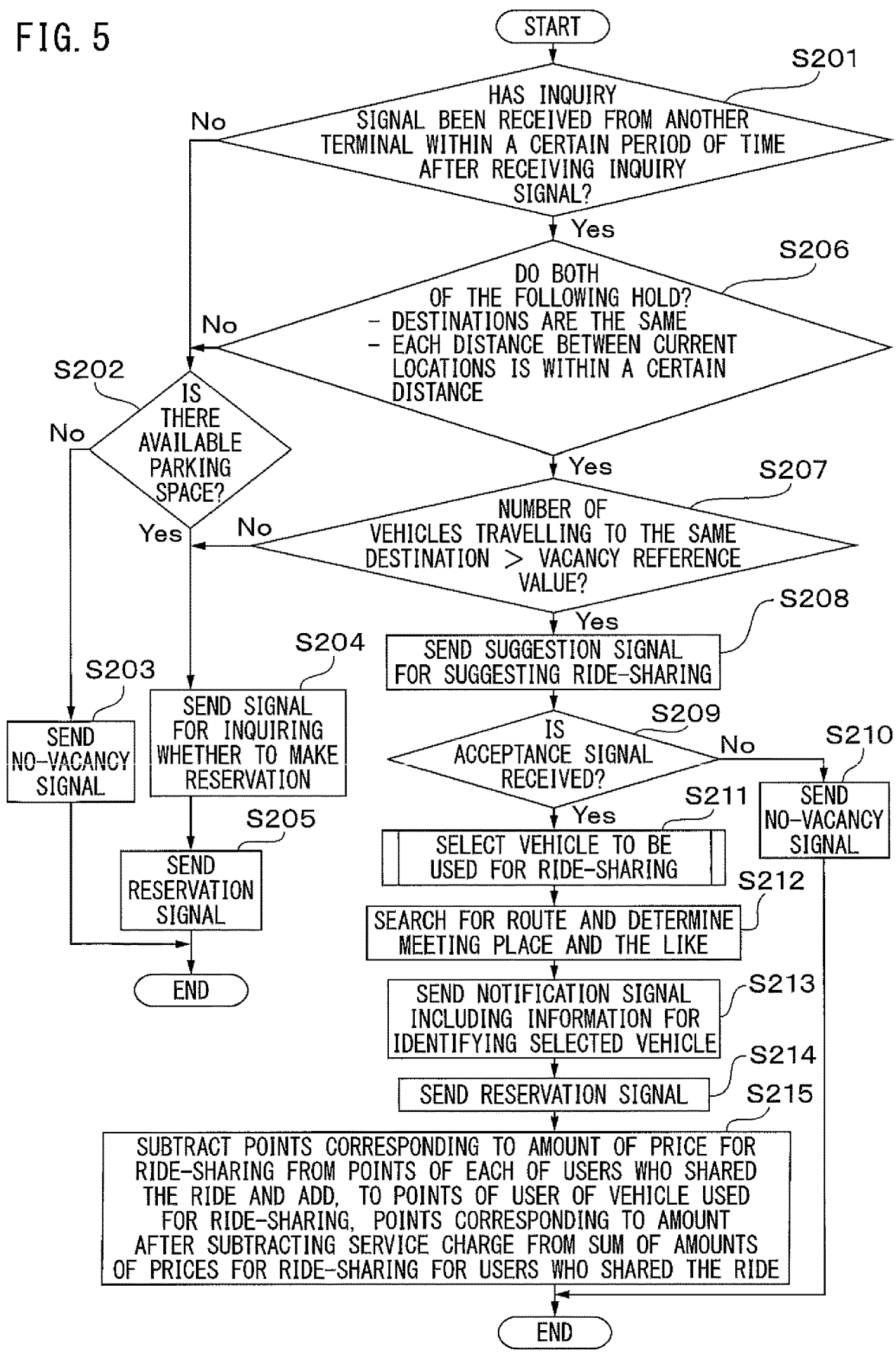
FIG. 5 is an operation flowchart of processing of a portion associated with the server of the ride-sharing assistance process.

FIG. 5 is an operation flowchart of processing of the portion associated with the server 2 of the ride-sharing assistance process. When the server 2 receives the inquiry signal from any one of the terminals 3-1 to 3-*n* via the communication network 4 and the communication interface 21, the processor 24 executes processing of the portion associated with the server 2 of the ride-sharing assistance process in accordance with the operation flowchart illustrated in FIG. 5.

The processor 24 determines whether the processor 24 has received, within a certain period of time after receiving the inquiry signal from any one of the terminals, an inquiry signal from another terminal (step S201). When the processor 24 has not received an inquiry signal from another terminal within the certain period of time (step S201-No), the processor 24 inquires of the garage management system, via the communication interface 21 and the communication network 4, about an available parking space within a certain range from the destination included in the inquiry signal, and determines whether there is an available parking space within the certain range (step S202). When there is no available parking space within the certain range (step S202-No), the processor 24 returns a no-vacancy signal indicating that there is no available parking space, via the communication interface 21 and the communication network 4, to the terminal (inquiry terminal) from which the inquiry signal has been sent (step S203). Then, the processor 24 ends the ride-sharing assistance process. On the other hand, when there is an available parking space (step S202—Yes), the processor 24 returns a signal indicating that there is an available parking space and inquiring whether to reserve the parking space to the inquiry terminal via the communication interface 21 and the communication network 4 (step S204). When there is a response indicating a request for reserving the parking space, within a certain period of time after the signal is sent, from the inquiry terminal via the communication network 4 and the communication interface 21, the processor 24 generates a reservation signal for reserving the parking space and sends the reservation signal to the garage management system via the communication interface 21 and the communication network 4 (step S205). The server 2 may read out, from the storage device 22, the vehicle license-plate number of the vehicle owned by the user of the inquiry terminal and include the vehicle license-plate number in the reservation signal. Then, the processor 24 ends the ride-sharing assistance process.

In the step S201, when the processor 24 has received an inquiry signal from another terminal within the certain period of time (step S201—Yes), the processor 24 retrieves, from each of the received inquiry signals, information indicating a destination and a current location, and determines whether the destinations are the same and whether a distance between the current locations is equal to or less than a certain distance (step S206). When the destinations are different or when the distance between the current locations is greater than the certain distance (step S206-No), the processor 24 executes, for each inquiry terminal, processing for the step S202 and later. In other words, the server 2 reserves a parking space individually for the user of each inquiry terminal. Then, the processor 24 ends the ride-sharing assistance process.

On the other hand, when the destinations are the same and the distance between the current locations is equal to or less than the certain distance (step S206—Yes), the processor 24 inquires of the garage management system, via the communication interface 21 and the communication network 4, about an available parking space within the certain range from the destination included in the inquiry signal. The processor 24 receives, from the garage management system, the number of available parking spaces, positions of the available parking spaces, and information on the available parking spaces via the communication network 4 and the communication interface 21. The processor 24 then determines whether the number of the inquiry terminals, i.e., the number of the vehicles of the users who are going to travel to the same destination, is greater than the vacancy reference value, which is obtained by subtracting the offset number from the number of the available parking spaces within the certain range (step S207).

When the number of the vehicles of the users who are going to travel to the same destination is equal to or less than the vacancy reference value (step S207-No), the processor 24 executes, for each inquiry terminal, processing for the step S204 and later. In other words, the server 2 reserves a parking space individually for the user of each inquiry terminal. Then, the processor 24 ends the ride-sharing assistance process.

On the other hand, when the number of the vehicles of the users who are going to travel to the same destination is greater than the vacancy reference value (step S207—Yes), the processor 24 determines to suggest ride-sharing. The processor 24 then generates a suggestion signal for suggesting ride-sharing, and sends the generated suggestion signal to each inquiry terminal via the communication interface 21 and the communication network 4 (step S208). The suggestion signal includes a message indicating, for example, that there are not enough parking spaces around the destination, that there are a plurality of users who are going to travel to the same destination, and a suggestion to the plurality of users to share a ride.

The processor 24 determines whether the processor 24 has received an acceptance signal from each inquiry terminal within a certain period of time after sending the suggestion signal (step S209). When the processor 24 has not received the acceptance signal from any one of the inquiry terminals within the certain period of time (step S209-No), the processor 24 generates a no-vacancy signal indicating that there is no available parking space, and sends the generated no-vacancy signal to each inquiry terminal via the communication interface 21 and the communication network 4 (step S210). Then, the processor 24 ends the ride-sharing assistance process.

On the other hand, when the processor 24 has received an acceptance signal from at least one of the terminals within the certain period of time (step S209—Yes), the processor 24 selects, from the vehicles owned by the users of the terminals from which the acceptance signal has been sent, a vehicle to be used for the ride-sharing (step S211). In addition, the processor 24 searches for a route, in a case where the selected vehicle is used for the ride-sharing, from the current location of the user of the vehicle to the destination, and determines a meeting place and a meeting time for each of the users (step S212). In this case, the processor 24 may search for a route, on the basis of the current locations of the users who have accepted to share a ride, in such a way that the route passes a location within a certain range (for example, 100 m to 200 m) from the current locations of the users and that the time required is the shortest, in accordance with a route search technique such as the Dijkstra's algorithm. Further, the processor 24 obtains, on the basis of the searched route, the meeting place and the meeting time for each of the users. The processor 24 then generates a notification signal for informing information for identifying the selected vehicle such as a vehicle license-plate number of the selected vehicle, a location of the parking space at the destination, the meeting place and the meeting time, etc., and sends the generated notification signal, via the communication interface 21 and the communication network 4, to each of the terminals from which the acceptance signal has been sent (step S213). The processor 24 then generates a reservation signal for reserving the parking space at the destination, and sends the generated reservation signal via the communication interface 21 and the communication network 4 to the garage management system (step S214).

Subsequently, the processor 24 reads out point information of a user corresponding to each of the terminals from which the acceptance signal has been sent, i.e., each of the users who shared the ride, from the storage device 22. The processor 24 then subtracts points corresponding to the amount of the price for the ride-sharing from a balance of points of the user whose vehicle was not used of the users who shared the ride, to update the points of the user, and stores the updated points in the storage device 22. Furthermore, the processor 24 adds, to a balance of points of the user of the vehicle used for the ride-sharing, points corresponding to the amount after subtracting the service charge from the sum of the amounts of the prices for the ride-sharing for the users who shared the ride, to update the points of the user of the vehicle, and stores the updated points in the storage device 22 (step S215). Then, the ride-sharing assistance system ends the ride-sharing assistance process.

In the step S209, when there are both a terminal that has returned the acceptance signal and a terminal that has not returned the acceptance signal within the certain period of time, the processor 24 may execute, for each terminal that has returned the acceptance signal, processing for the steps S211 to S215, and execute, for each terminal that has not returned the acceptance signal, processing for the step S210.

Next, details of a process of selecting a vehicle to be used for ride-sharing will be described.

Figure 6:
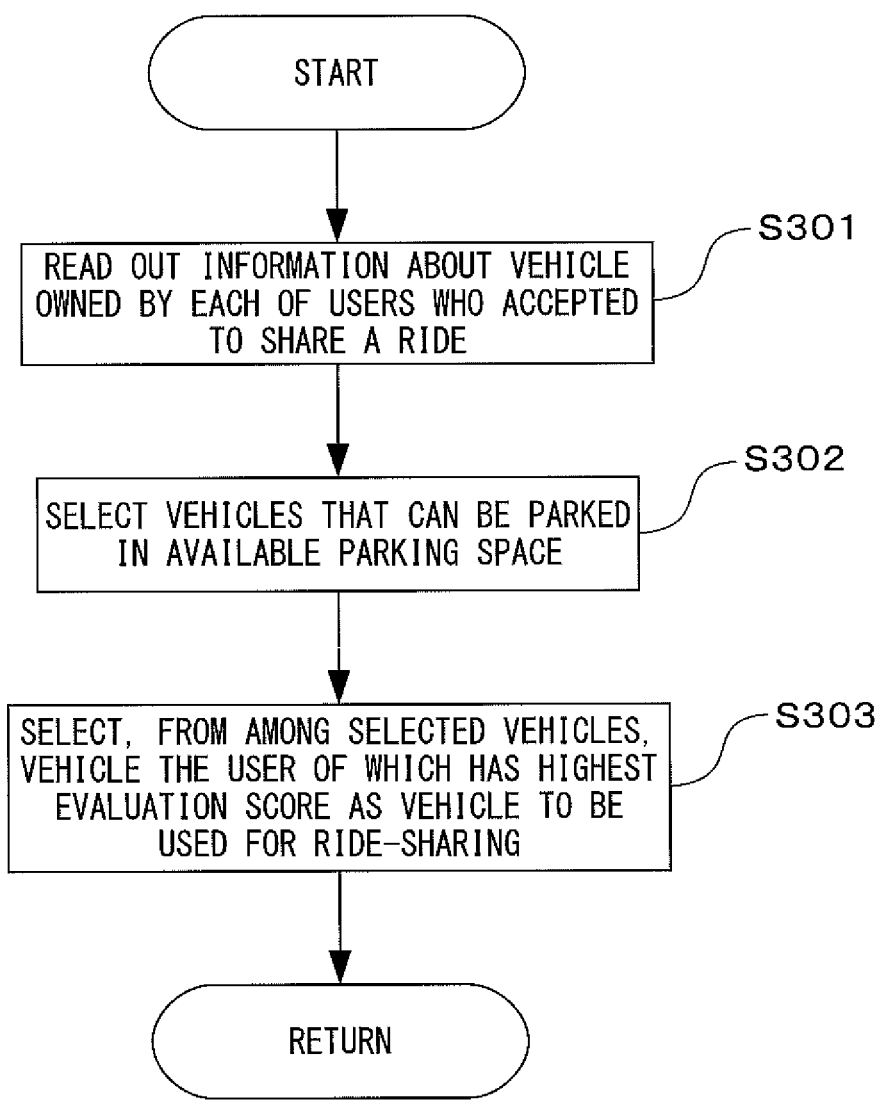
FIG. 6 is an operation flowchart of a process of selecting a vehicle to be used for ride-sharing.

FIG. 6 is an operation flowchart of the process of selecting a vehicle to be used for ride-sharing, which process is executed in the step S211 of the operation flowchart illustrated in FIG. 5.

The processor 24 reads out information on a vehicle owned by the user of each terminal from which the acceptance signal has been returned i.e., each of the users who accepted to share a ride, from the storage device 22 (step S301). The processor 24 then refers to the information on the available parking space, which has been received from the garage management system, and the information on the vehicle of each of the users who accepted to share the ride to select vehicles that can be parked in the available parking space from the vehicles of the users who accepted to share the ride (step S302). For example, when a size of the available parking space is a size for a small automobile, a small automobile is selected from the vehicles of the users who accepted to share the ride. As another example, when there is no charging facility at the available parking space, an automobile other than an electric automobile is selected from the vehicles of the users who accepted to share the ride. As still another example, when there is a height limit for the available parking space, an automobile that satisfies the height limit is selected from the vehicles of the users who accepted to share the ride.

The processor 24 selects, from the vehicles selected in the step S302, a vehicle the user of which has the highest evaluation score as the vehicle to be used for the ride-sharing (step S303). An evaluation score for a user may be obtained as follows. For example, the information on the vehicles includes an evaluation item that is defined in advance and that includes at least one of fuel economy (the less the fuel economy, the better the evaluation score), accident history (the less the past accidents, the better the evaluation score), a size of the vehicle interior (the larger the size, the better the evaluation score), a vehicle price (the higher the price, the better the evaluation score), and years since registration (the less the years, the better the evaluation score). Of these evaluation items, the size of the vehicle interior, the vehicle price, and the years since registration are examples of evaluation items related to comfort of the vehicle. The processor 24 gives a predetermined evaluation value (for example, one point) to a vehicle that is the best, for each of the evaluation items, among the vehicles selected in the step S302. A sum of the evaluation values given to the selected vehicles is calculated as the evaluation score for the user. Evaluation items may include, in addition to the above items related to vehicles, a time required to reach the destination (the shorter the time, the better the evaluation score). The evaluation value for each evaluation item may be given a larger value as the ranking for the evaluation item is higher.

According to a variation, in the step S213 of the operation flowchart illustrated in FIG. 5, the processor 24 may receive, within a certain period of time after informing the selected vehicle, via the communication network 4 and the communication interface 21 from each of the terminals from which the acceptance signal has been sent, a signal for confirming whether the selected vehicle will do. When the processor 24 receives, from at least one terminal, a signal indicating that the at least one terminal refuses use of the selected vehicle for the ride-sharing, the processor 24 may re-select a vehicle the user of which is given the second highest evaluation score as the vehicle to be used for the ride-sharing and execute, for the re-selected vehicle, the processing for the step S212 and later again.

When there are parking spaces available for a plurality of vehicles, in the step S211 of the operation flowchart illustrated in FIG. 5 and the step S303 of the operation flowchart illustrated in FIG. 6, the processor 24 may select vehicles, the number of which is up to the number of the available parking spaces and two or more. In this case, the processor 24 may select two or more vehicles in the order of the evaluation scores for the users from highest. The processor 24 may also select, for each of the selected vehicles, users who will share a ride in such a way that a sum of times required for each of the selected vehicles from the current location of the user of the vehicle to the destination is minimum.

Next, details of the terminals 3-1 to 3-n will be described. With respect to a configuration associated with the ride-sharing assistance process, each terminal may have the same configuration; therefore, only the configuration of the terminal 3-1 will be described below.

Figure 7:
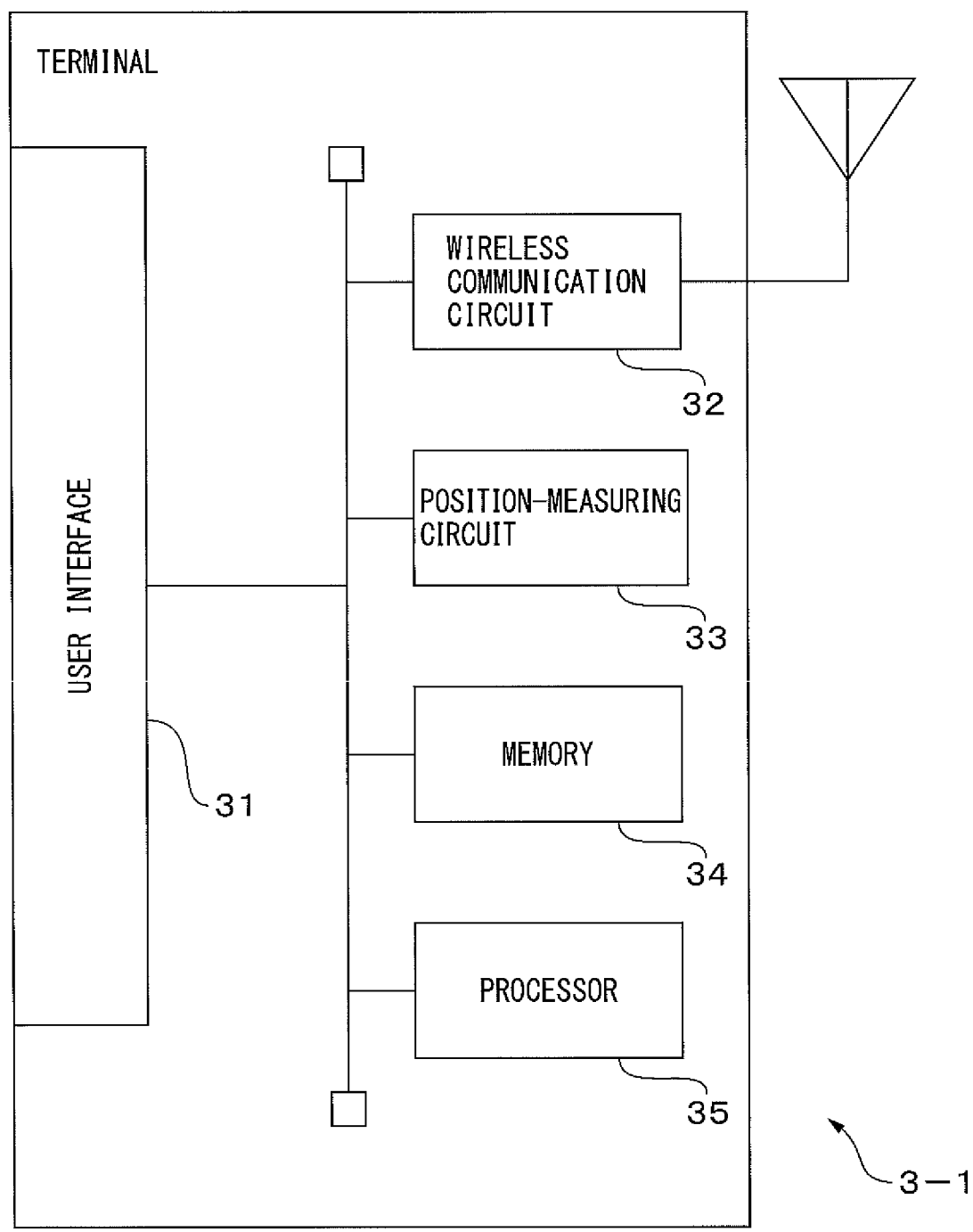
FIG. 7 is a schematic configuration diagram of a terminal.

FIG. 7 is a schematic configuration diagram of the terminal 3-1. The terminal 3-1 includes a user interface 31, a wireless communication circuit 32, a position-measuring circuit 33, a memory 34, and a processor 35. The terminal 3-1 may further include a near field wireless communication circuit (not illustrated) for performing wireless communication with an in-vehicle device.

The user interface 31 includes, for example, a touchscreen display. The user interface 31 generates a signal according to an operation by a user associated with the ride-sharing assistance process (for example, starting of an application associated with the ride-sharing assistance process, input of a destination when inquiring an available parking space, or whether to accept ride-sharing when receiving a suggestion signal), and outputs the signal to the processor 35. In addition, the user interface 31 displays various types of information for display received from the processor 35 (for example, a message for suggesting ride-sharing when receiving a suggestion signal, information for identifying a vehicle to be used for the ride-sharing such as a vehicle license-plate number of the vehicle when receiving a notification signal, a meeting place, or a meeting time).

The wireless communication circuit 32 includes, for example, an antenna and a signal processing circuit for executing various types of processes associated with wireless communication such as modulation and demodulation of a radio signal. The wireless communication circuit 32 receives a downlink radio signal from the wireless base station 5 connected to the communication network 4 via a gateway or the like, and sends an uplink radio signal to the wireless base station 5. In other words, the wireless communication circuit 32 retrieves, from the downlink radio signal received from the wireless base station 5, a signal transmitted from the server 2 to the terminal 3-1 (for example, a suggestion signal or a notification signal), and passes the signal to the processor 35. The wireless communication circuit 32 also generates an uplink radio signal including a signal received from the processor 35 and sent to the server 2 (for example, an inquiry signal or an acceptance signal), and sends the radio signal.

The position-measuring circuit 33 obtains information indicating a location of the terminal 3-1. The position-measuring circuit 33 includes, for example, a receiver for receiving a GPS signal and an arithmetic circuit for calculating the location of the terminal 3-1 from the GPS signal. The position-measuring circuit 33 measures the location of the terminal 3-1 on the basis of the GPS signal. Every time the position-measuring circuit 33 measures the location of the terminal 3-1, the position-measuring circuit 33 informs the processor 35 of the location.

The memory 34 includes, for example, non-volatile readable/writable semiconductor memory and volatile readable/writable semiconductor memory. The memory 34 stores various types of application programs to be executed by the processor 35 and various types of data. The memory 34 stores various types of data associated with execution of the ride-sharing assistance process.

The processor 35 includes one or more CPUs and a peripheral circuit thereof. The processor 35 may further include another arithmetic circuit such as an arithmetic logic unit or a numeric data processing unit. The processor 35 executes processing of a portion associated with the terminal 3-1 of the ride-sharing assistance process. For example, the processor 35 generates, in response to an operation by the user, a signal to be sent to the server 2 (an inquiry signal, an acceptance signal, or the like), and outputs the generated signal to the wireless communication circuit 32.

For example, in a state in which an application associated with the ride-sharing assistance process is started, when the user operates the user interface 31 in order to request information on a parking space and to input a destination, the processor 35 generates an inquiry signal including the input destination, the current location of the terminal 3-1 measured by the position-measuring circuit 33, and identification information on the terminal 3-1.

Upon receiving the suggestion signal, when the user operates the user interface 31 in order to indicate that the user accepts the ride-sharing, the processor 35 also generates an acceptance signal. Upon receiving a notification signal, the processor 35 further retrieves information for identifying the vehicle to be used for the ride-sharing, a location of the parking space at the destination, and the meeting place and the meeting time, which are included in the notification signal, and causes the user interface 31 to display these pieces of information. In this case, to help the user understand the location of the parking space to be guided at the destination, the processor 35 may display a map that indicates the location of the parking space to be guided on the user interface 31. The processor 35 may further display the meeting place together with the map.

As described above, the ride-sharing assistance apparatus determines, when there are a plurality of users who are going to travel to a same destination, whether to suggest ride-sharing on the basis of the number of the users and the number of available parking spaces. Therefore, the ride-sharing assistance apparatus can appropriately determine whether to suggest ride-sharing. In addition, the ride-sharing assistance apparatus selects a vehicle for which an evaluation score calculated on the basis of a plurality of evaluation items is maximum from among vehicles of users who accept to share a ride as a vehicle to be used for the ride-sharing. Therefore, the ride-sharing assistance apparatus can appropriately determine a vehicle to be used for ride-sharing.

According to a variation, each of terminals 3-1 to 3-n may include information on a vehicle owned by the user of the terminal in an inquiry signal. In this case, the memory 34 of each terminal may store the information on the vehicle owned by the user of the terminal in advance. When the processor 35 of each terminal generates the inquiry signal, the processor 35 may read out, from the memory 34, the information on the vehicle owned by the user of the terminal, and include the information in the inquiry signal. Alternatively, the user of each terminal may operate the user interface 31 in accordance with an application program associated with the ride-sharing assistance process, to input the information on the vehicle, and the processor 35 may include the input information on the vehicle in the inquiry signal. With this operation, even if the information on the vehicle owned by the user has not been registered in advance, the server 2 can determine a vehicle to be used for ride-sharing.

According to another variation, when ride-sharing is suggested, the server 2 may omit sending a suggestion signal to an inquiry terminal. In this case, processing for the steps S106 and S107 of the sequence diagram illustrated in FIG. 3 and processing for the steps S208 to S210 of the operation flowchart illustrated in FIG. 5 may be omitted. The processor 24 of the server 2 may select a vehicle to be used for ride-sharing from among the vehicles of the users of inquiry terminals in accordance with the operation flowchart illustrated in FIG. 6. According to this variation, a procedure for suggesting ride-sharing is simplified; thus, complexity that the user of each inquiry terminal suffers will be reduced.

According to still another variation, each of terminals 3-1 to 3-n may include the number of fellow passengers (a number including the user oneself) in an inquiry signal. In this case, the information on the vehicle owned by the user of each terminal may include a riding capacity. When the server 2 selects a vehicle to be used for ride-sharing, the server 2 may select the vehicle in such a way that a sum of the numbers of fellow passengers included in the respective inquiry signals sent from the inquiry terminals is equal to or less than the riding capacity. With this operation, even if there is a fellow passenger, the server 2 can appropriately determine a vehicle to be used for ride-sharing.

According to yet still another variation, the amount of the price for ride-sharing may be defined according to a vehicle used for the ride-sharing. For example, the amount of the price for the ride-sharing may be defined in such a way that the amount of the price for the ride-sharing is higher as a purchase price of the vehicle used for the ride-sharing is higher, or as a class of the vehicle used for the ride-sharing is more upper. With this operation, it is expected that the user of the vehicle used for the ride-sharing is more satisfied with the amount of the price for the ride-sharing.

According to yet still another variation, a server for managing points of a user of each terminal (for distinction from the server 2, hereinafter referred to as a point management server) may be provided separately from the server 2. The point management server may be capable of communicating with the server 2 via the communication network 4. In this case, in processing of a part associated with the ride-sharing assistance process illustrated in FIG. 5, processing for the step S215 may be omitted. Instead, the processor 24 of the server 2 may generate a signal for informing points to be added to the points of the user of the vehicle used for the ride-sharing and points to be subtracted from the points of the user who shared the ride, and send the signal to the point management server via the communication interface 21 and the communication network 4.

According to yet still another variation, the server 2 itself may have a function of the garage management system. In a system in which the garage management system cannot reserve a parking space, processing for the step S109 of the sequence diagram illustrated in FIG. 3 and processing for the step S214 of the operation flowchart illustrated in FIG. 5 may be omitted. In this case, to avoid a situation in which available parking spaces are gone between a period of time from when ride-sharing is suggested to when the vehicle on which the users share a ride arrives at the parking space, an offset number used for setting the vacancy reference value may be set to a value larger than the offset number in the aforementioned example embodiment (for example, 3 to 5).

The computer program that causes a computer to execute the aforementioned process to be executed by the processor 24 of the server 2 may be recorded and distributed on a recording medium, for example, an optical recording medium or a magnetic recording medium.

As described above, those skilled in the art may make various modifications according to embodiments within the scope of the present invention.

What is claimed is:

1. A ride-sharing assistance system comprising:
a plurality of terminals, each of the plurality of terminals comprising a user interface, the user interface including a display; and
a ride-sharing assistance apparatus comprising a communication interface, the ride-sharing assistance apparatus being configured to:
communicate with each of the plurality of terminals via the communication interface;
receive, via the communication interface, a number of inquiry signals from at least two terminals of the plurality of terminals for requesting inquiry about an availability of a parking space;
determine whether the number of the inquiry signals received from the at least two terminals requesting the availability of the parking space at a same destination is greater than a vacancy reference value, the vacancy reference value being based on a number of available parking spaces within a predetermined distance from the destination; and
when the number of the inquiry signals is greater than the vacancy reference value, transmit, via the communication interface, a suggestion signal to each of the at least two terminals from which an inquiry signal has been sent,
wherein the suggestion signal is for suggesting ride-sharing on one vehicle associated with any one of users of the at least two terminals, from which the inquiry signal has been sent, via the communication interface;
receive, via the communication interface, acceptance signals from at least two acceptance terminals of the at least two terminals;
select, as the one vehicle to be used for the ride-sharing, a vehicle from among vehicles associated with the users of the at least two acceptance terminals;
search for a route from a current location of a user of the selected vehicle to the destination to determine a meeting place and a meeting time for each of the users of the at least two acceptance terminals; and
transmit, via the communication interface, a notification signal for informing the meeting place and the meeting time for each of the users of the at least two acceptance terminals to the user interface of each of the at least two acceptance terminals,
when the user interface receives the notification signal, the display of each of the at least two acceptance terminals displays a notification of the meeting place and the meeting time.

2. A ride-sharing assistance method in a ride-sharing assistance system comprising: a plurality of terminals, each of the plurality of terminals comprising a user interface, the user interface including a display; and a ride-sharing assistance apparatus comprising a communication interface, the ride-sharing assistance apparatus being configured to communicate with each of the plurality of terminals, the method comprising:
sending, by at least two terminals of the plurality of terminals, an inquiry signal to the ride-sharing assistance apparatus, via the communication interface of the ride-sharing assistance apparatus, the inquiry signal being for requesting inquiry about an availability of a parking space at a same destination;
determining whether a number of the inquiry signals received from the at least two terminals requesting the availability of the parking space at the same destination is greater than a vacancy reference value, the vacancy reference value being based on a number of available parking spaces within a predetermined distance from the destination;

when the number of the inquiry signals is greater than the vacancy reference value, transmitting, via the communication interface of the ride-sharing assistance apparatus, a suggestion signal to each of the at least two terminals from which the inquiry signal has been sent, wherein the suggestion signal is for suggesting ride-sharing on one vehicle associated with any one of users of the at least two terminals, from which the inquiry signal has been sent, via the communication interface of the ride-sharing assistance apparatus;

receiving, via the communication interface of the ride-sharing assistance apparatus, acceptance signals from at least two acceptance terminals of the at least two terminals;

selecting, as the one vehicle to be used for the ride-sharing, a vehicle from among vehicles associated with the users of the at least two acceptance terminals;

searching for a route from a current location of the user of the selected vehicle to the destination to determine a meeting place and a meeting time for each of the users of the at least two acceptance terminals;

transmitting, via the communication interface of the ride-sharing assistance apparatus, a notification signal for informing the meeting place and the meeting time for each of the users of the at least two acceptance terminals to the user interface of each of the at least two acceptance terminals; and when the user interface receives the notification signal, displaying, by the display of each of the at least two acceptance terminals, a notification of the meeting place and the meeting time.

* * * * *